(12) United States Patent
Grube et al.

(10) Patent No.: US 11,853,547 B1
(45) Date of Patent: Dec. 26, 2023

(54) GENERATING AUDIT RECORD DATA FILES FOR A TRANSACTION IN A STORAGE NETWORK

(71) Applicant: Pure Storage, Inc., Mountain View, CA (US)

(72) Inventors: Gary W. Grube, Barrington Hills, IL (US); Timothy W. Markison, Mesa, AZ (US); Jason K. Resch, Chicago, IL (US)

(73) Assignee: Pure Storage, Inc., Santa Clara, CA (US)

( * ) Notice: Subject to any disclaimer, the term of this patent is extended or adjusted under 35 U.S.C. 154(b) by 88 days.

(21) Appl. No.: 17/079,234

(22) Filed: Oct. 23, 2020

Related U.S. Application Data

(63) Continuation of application No. 15/466,322, filed on Mar. 22, 2017, now abandoned, which is a
(Continued)

(51) Int. Cl.
  *G06F 3/06* (2006.01)
  *H04L 67/1097* (2022.01)
  (Continued)

(52) U.S. Cl.
  CPC ............ *G06F 3/0605* (2013.01); *G06F 3/067* (2013.01); *G06F 3/0619* (2013.01);
  (Continued)

(58) Field of Classification Search
  CPC .... G06F 3/0605; G06F 3/0619; G06F 3/0644; G06F 3/0659; G06F 3/067;
  (Continued)

(56) References Cited

U.S. PATENT DOCUMENTS 4,092,732 A    5/1978   Ouchi
5,404,509 A *   4/1995   Klein ...................... G06F 16/00
                                                                                         715/255
(Continued)

OTHER PUBLICATIONS

Chung; An Automatic Data Segmentation Method for 3D Measured Data Points; National Taiwan University; pp. 1-8, 1998.
(Continued)

*Primary Examiner* — Marc S Somers
(74) *Attorney, Agent, or Firm* — Garlick & Markison; Timothy D. Taylor

(57) ABSTRACT

A method begins by a computing device of a storage network receiving a data access request of a transaction regarding a data segment, where at least one data segment is dispersed storage error encoded into a set of encoded data slices that are stored in a set of storage units of the storage network. The method continues by executing the data access request. The method continues by generating a set of audit record data files regarding the execution of the data access request, where an audit record data file includes a source identifier, a target identifier, a unique identifier associated with the data segment, a timestamp, and a type code that indicates a type of storage network activity associated with the transaction. The method continues by storing the set of audit record data files in the storage network.

20 Claims, 8 Drawing Sheets

Related U.S. Application Data continuation-in-part of application No. 13/450,000, filed on Apr. 18, 2012, now Pat. No. 10,452,836.

(60) Provisional application No. 61/483,856, filed on May 9, 2011.

(51) Int. Cl.

| | | |
|---|---|---|
| *G06F 11/30* | (2006.01) | |
| *G06F 16/23* | (2019.01) | |
| *G06F 11/10* | (2006.01) | |
| *G06F 21/62* | (2013.01) | |
| *G06F 16/182* | (2019.01) | |
| *H03M 13/15* | (2006.01) | |
| *H03M 13/00* | (2006.01) | |

(52) U.S. Cl.
CPC ......... *G06F 3/0644* (2013.01); *G06F 3/0659* (2013.01); *G06F 11/1076* (2013.01); *G06F 11/3006* (2013.01); *G06F 11/3034* (2013.01); *G06F 16/182* (2019.01); *G06F 16/2358* (2019.01); *G06F 16/2365* (2019.01); *G06F 21/62* (2013.01); *H04L 67/1097* (2013.01); *G06F 2201/81* (2013.01); *G06F 2201/87* (2013.01); *G06F 2211/1028* (2013.01); *H03M 13/1515* (2013.01); *H03M 13/616* (2013.01)

(58) Field of Classification Search
CPC ............... G06F 16/2365; G06F 16/182; G06F 16/2358; G06F 11/3006; G06F 11/3034; G06F 11/1076; G06F 21/62; G06F 2201/81; G06F 2201/87; G06F 2211/1028; H04L 67/1097; H03M 13/1515; H03M 13/616

See application file for complete search history.

(56) References Cited

U.S. PATENT DOCUMENTS

| | | |
|---|---|---|
| 5,454,101 A | 9/1995 | Mackay |
| 5,485,474 A | 1/1996 | Rabin |
| 5,774,643 A | 6/1998 | Lubbers |
| 5,793,028 A | 8/1998 | Wagener |
| 5,802,364 A | 9/1998 | Senator |
| 5,809,285 A | 9/1998 | Hilland |
| 5,890,156 A | 3/1999 | Rekieta |
| 5,987,622 A | 11/1999 | Lo Verso |
| 5,991,414 A | 11/1999 | Garay |
| 6,012,159 A | 1/2000 | Fischer |
| 6,058,454 A | 5/2000 | Gerlach |
| 6,128,277 A | 10/2000 | Bruck |
| 6,175,571 B1 | 1/2001 | Haddock |
| 6,192,472 B1 | 2/2001 | Garay |
| 6,256,688 B1 | 7/2001 | Suetaka |
| 6,272,658 B1 | 8/2001 | Steele |
| 6,301,604 B1 | 10/2001 | Nojima |
| 6,356,949 B1 | 3/2002 | Katsandres |
| 6,366,995 B1 | 4/2002 | Vilkov |
| 6,374,336 B1 | 4/2002 | Peters |
| 6,415,373 B1 | 7/2002 | Peters |
| 6,418,539 B1 | 7/2002 | Walker |
| 6,449,688 B1 | 9/2002 | Peters |
| 6,567,948 B2 | 5/2003 | Steele |
| 6,571,282 B1 | 5/2003 | Bowman-Amuah |
| 6,609,223 B1 | 8/2003 | Wolfgang |
| 6,718,361 B1 | 4/2004 | Basani |
| 6,760,808 B2 | 7/2004 | Peters |
| 6,785,768 B2 | 8/2004 | Peters |
| 6,785,783 B2 | 8/2004 | Buckland |
| 6,792,469 B1 | 9/2004 | Callahan |
| 6,826,711 B2 | 11/2004 | Moulton |
| 6,879,596 B1 | 4/2005 | Dooply |
| 6,938,044 B1 | 8/2005 | Milby |
| 7,003,688 B1 | 2/2006 | Pittelkow |
| 7,024,451 B2 | 4/2006 | Jorgenson |
| 7,024,609 B2 | 4/2006 | Wolfgang |
| 7,080,101 B1 | 7/2006 | Watson |
| 7,103,824 B2 | 9/2006 | Halford |
| 7,103,915 B2 | 9/2006 | Redlich |
| 7,111,115 B2 | 9/2006 | Peters |
| 7,140,044 B2 | 11/2006 | Redlich |
| 7,146,644 B2 | 12/2006 | Redlich |
| 7,171,493 B2 | 1/2007 | Shu |
| 7,222,133 B1 | 5/2007 | Raipurkar |
| 7,240,236 B2 | 7/2007 | Cutts |
| 7,272,613 B2 | 9/2007 | Sim |
| 7,451,236 B2 | 11/2008 | Savitzky |
| 7,636,724 B2 | 12/2009 | de la Torre |
| 7,865,471 B1* | 1/2011 | Stagg ................. G06F 11/1471 707/661 |
| 7,865,594 B1 | 1/2011 | Baumback |
| 7,970,940 B1 | 6/2011 | Van De Ven |
| 2002/0062422 A1 | 5/2002 | Butterworth |
| 2002/0166079 A1 | 11/2002 | Ulrich |
| 2003/0018927 A1 | 1/2003 | Gadir |
| 2003/0037261 A1 | 2/2003 | Meffert |
| 2003/0041091 A1 | 2/2003 | Cheline |
| 2003/0065617 A1 | 4/2003 | Watkins |
| 2003/0084020 A1 | 5/2003 | Shu |
| 2003/0228015 A1* | 12/2003 | Futa .................. H04L 63/0823 380/201 |
| 2004/0024963 A1 | 2/2004 | Talagala |
| 2004/0054644 A1* | 3/2004 | Ganesh ............... G06F 16/2358 |
| 2004/0122917 A1 | 6/2004 | Menon |
| 2004/0215998 A1 | 10/2004 | Buxton |
| 2004/0228493 A1 | 11/2004 | Ma |
| 2004/0250031 A1* | 12/2004 | Ji ....................... G06F 11/2066 714/E11.107 |
| 2005/0100022 A1 | 5/2005 | Ramprashad |
| 2005/0114594 A1 | 5/2005 | Corbett |
| 2005/0125593 A1 | 6/2005 | Karpoff |
| 2005/0131993 A1 | 6/2005 | Fatula |
| 2005/0132070 A1 | 6/2005 | Redlich |
| 2005/0144382 A1 | 6/2005 | Schmisseur |
| 2005/0229069 A1 | 10/2005 | Hassner |
| 2006/0047907 A1 | 3/2006 | Shiga |
| 2006/0136448 A1 | 6/2006 | Cialini |
| 2006/0156059 A1 | 7/2006 | Kitamura |
| 2006/0224603 A1 | 10/2006 | Correll, Jr. |
| 2007/0079081 A1 | 4/2007 | Gladwin |
| 2007/0079082 A1 | 4/2007 | Gladwin |
| 2007/0079083 A1 | 4/2007 | Gladwin |
| 2007/0088970 A1 | 4/2007 | Buxton |
| 2007/0112869 A1* | 5/2007 | Gadiraju .............. G06F 16/21 |
| 2007/0174192 A1 | 7/2007 | Gladwin |
| 2007/0214285 A1 | 9/2007 | Au |
| 2007/0234110 A1 | 10/2007 | Soran |
| 2007/0283167 A1 | 12/2007 | Venters, III |
| 2008/0221911 A1 | 9/2008 | Cherkasova |
| 2009/0094251 A1 | 4/2009 | Gladwin |
| 2009/0094318 A1 | 4/2009 | Gladwin |
| 2010/0023524 A1 | 1/2010 | Gladwin |
| 2010/0070515 A1 | 3/2010 | Dutton et al. |
| 2010/0161916 A1 | 6/2010 | Thornton |
| 2010/0287200 A1 | 11/2010 | Dhuse |
| 2011/0029524 A1 | 2/2011 | Baptist |
| 2011/0066595 A1* | 3/2011 | Kreuder ............. G06F 11/2048 707/634 |
| 2013/0041875 A1 | 2/2013 | Kan |
| 2013/0080500 A1* | 3/2013 | Ishikawa ............ G06Q 10/06 709/201 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

(56) References Cited

OTHER PUBLICATIONS

Legg; Lightweight Directory Access Protocol (LDAP): Syntaxes and Matching Rules; IETF Network Working Group; RFC 4517; Jun. 2006; pp. 1-50.
Plank, T1: Erasure Codes for Storage Applications; FAST2005, 4th Usenix Conference on File Storage Technologies; Dec. 13-16, 2005; pp. 1-74.
Rabin; Efficient Dispersal of Information for Security, Load Balancing, and Fault Tolerance; Journal of the Association for Computer Machinery; vol. 36, No. 2; Apr. 1989; pp. 335-348.
Satran, et al.; Internet Small Computer Systems Interface (iSCSI); IETF Network Working Group; RFC 3720; Apr. 2004; pp. 1-257.
Sciberras; Lightweight Directory Access Protocol (LDAP): Schema for User Applications; IETF Network Working Group; RFC 4519; Jun. 2006; pp. 1-33.
Sermersheim; Lightweight Directory Access Protocol (LDAP): The Protocol; IETF Network Working Group, RFC 4511; Jun. 2006; pp. 1-68.
Shamir; How to Share a Secret; Communications of the ACM; vol. 22, No. 11; Nov. 1979; pp. 612-613.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.
Zeilenga; Lightweight Directory Access Protocol (LDAP): Technical Specification Road Map; IETF Network Working Group; RFC 4510; Jun. 2006; pp. 1-8.

* cited by examiner

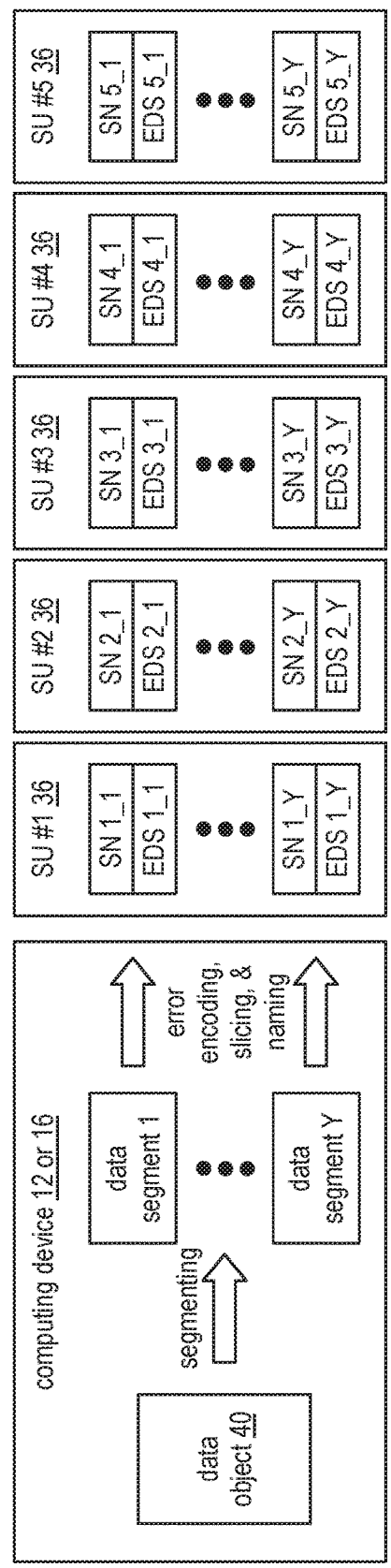
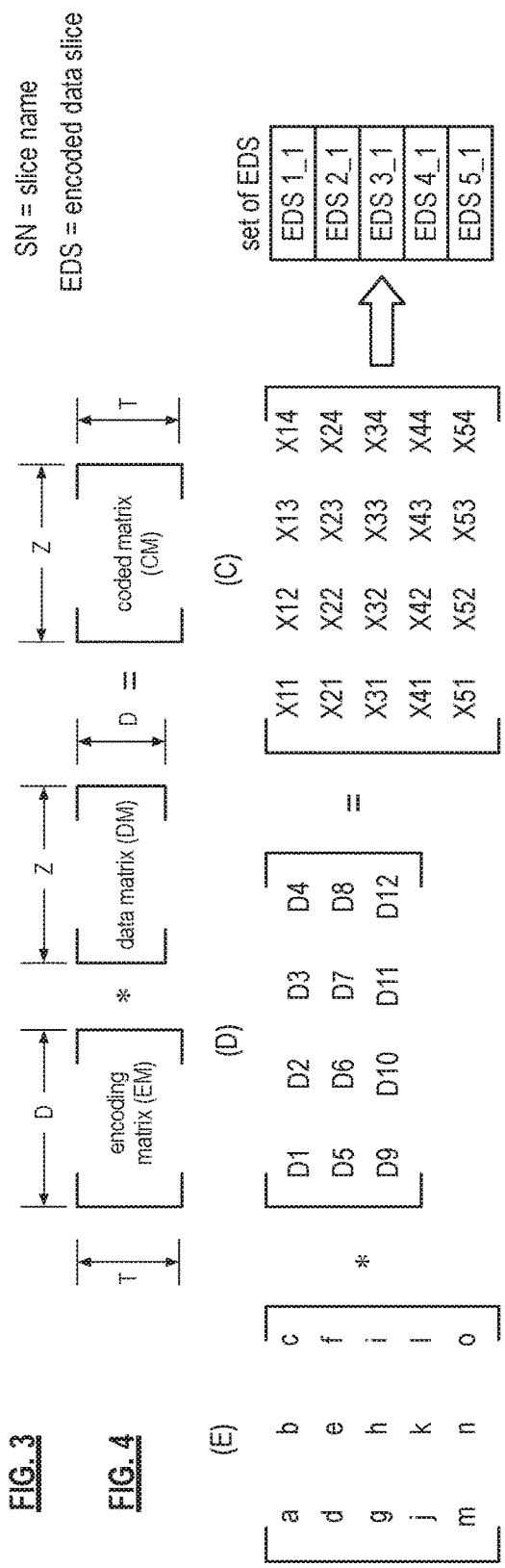

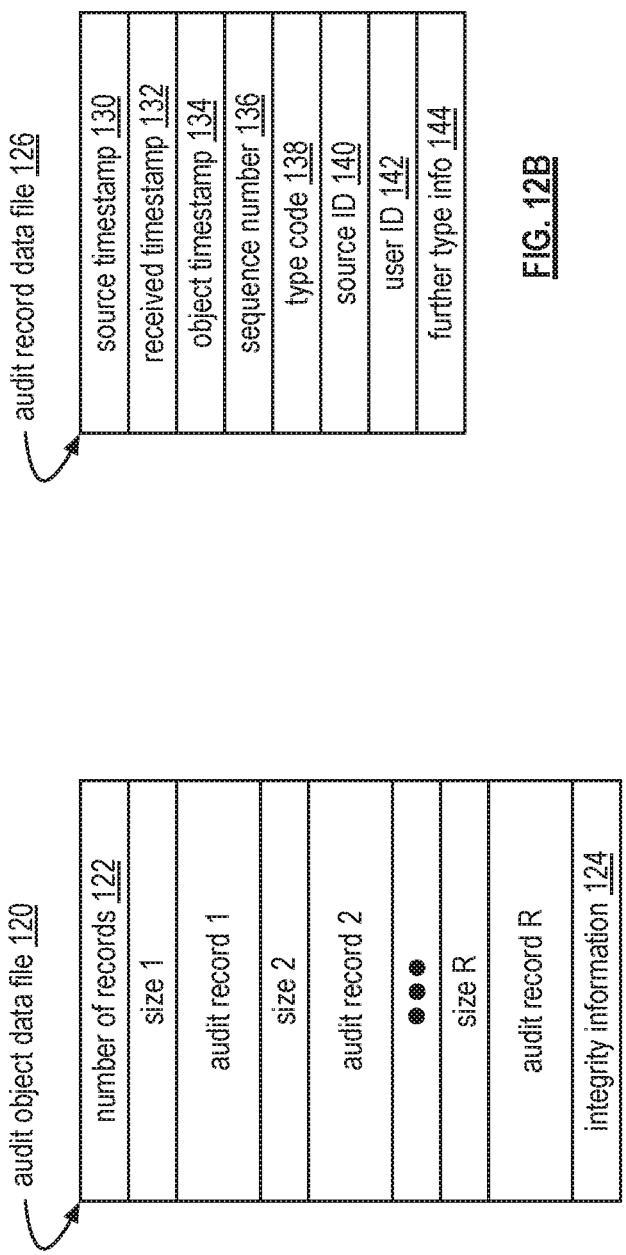
FIG. 12B
FIG. 12A
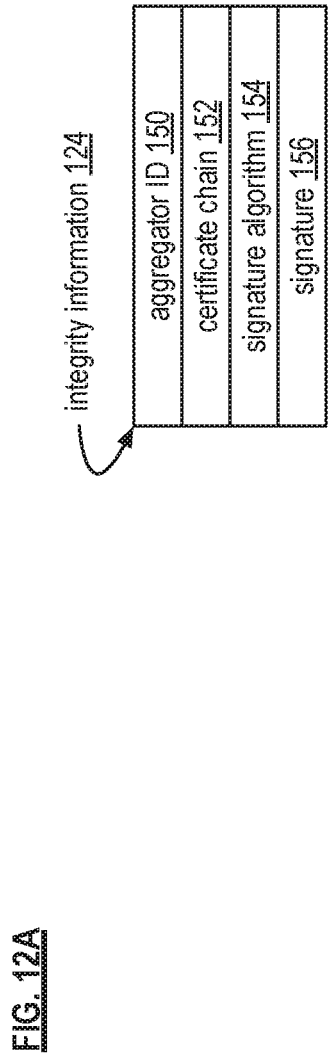
FIG. 12C

GENERATING AUDIT RECORD DATA FILES FOR A TRANSACTION IN A STORAGE NETWORK

CROSS-REFERENCE TO RELATED APPLICATIONS

The present U.S. Utility Patent application claims priority pursuant to 35 U.S.C. § 120 as a continuation of U.S. Utility application Ser. No. 15/466,322, entitled "Auditing A Transaction In A Dispersed Storage Network", filed Mar. 22, 2017, which is a continuation-in-part of U.S. Utility application Ser. No. 13/450,000, entitled "Retrieving A Hypertext Markup Language File From A Dispersed Storage Network Memory", filed Apr. 18, 2012, issued as U.S. Pat. No. 10,452,836 on Oct. 22, 2019, which claims priority pursuant to 35 U.S.C. § 119(e) to U.S. Provisional Application No. 61/483,856, entitled "Content Distribution Network Utilizing A Dispersed Storage Network", filed May 9, 2011, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 12A is a diagram illustrating an example of an audit object file structure in accordance with the present invention;

FIG. 12B is a diagram illustrating an example of an audit record file structure in accordance with the present invention;

FIG. 12C is a diagram illustrating an example of integrity information structure in accordance with the present invention.

DETAILED DESCRIPTION OF THE INVENTION

Figure 1:
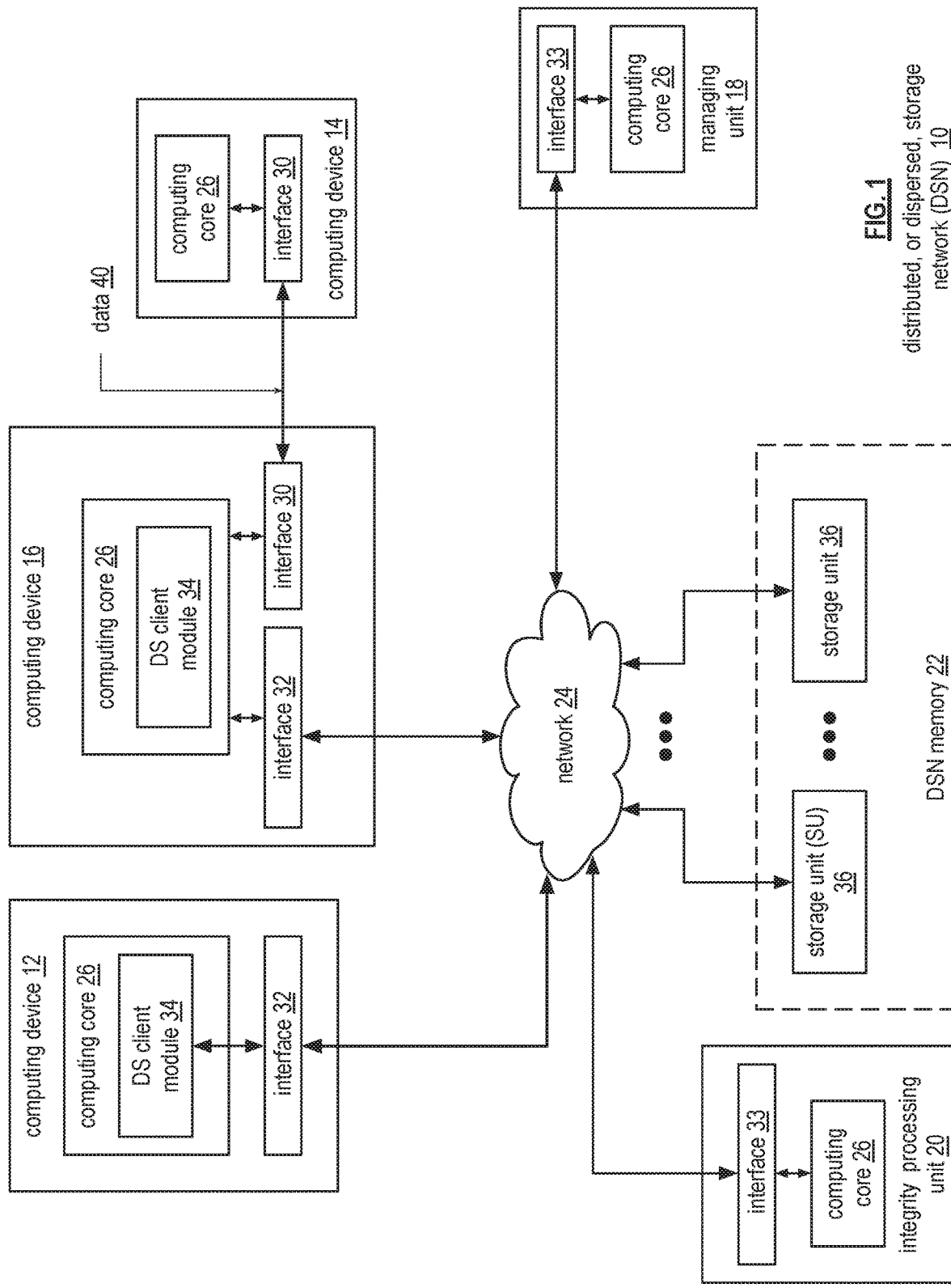
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
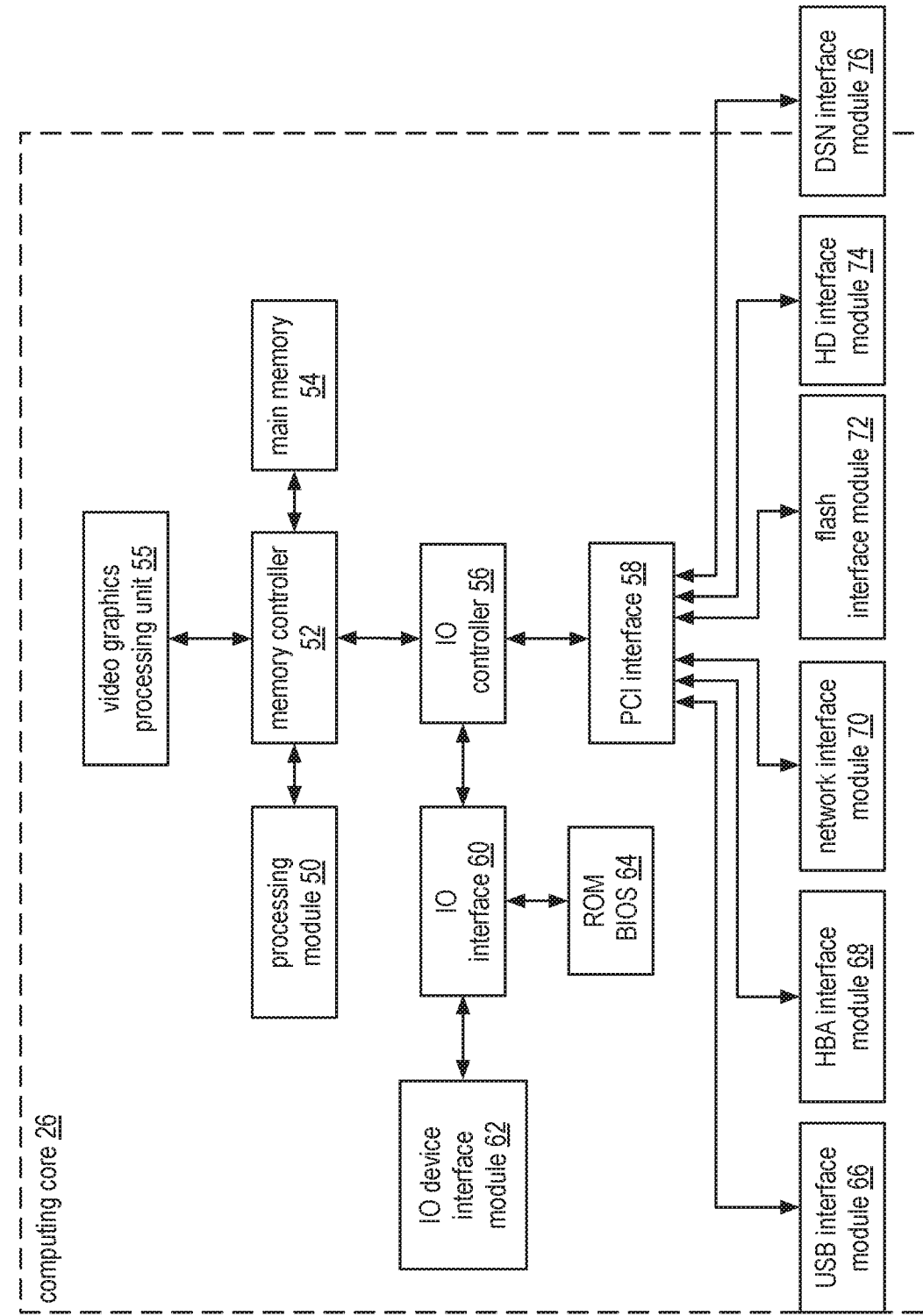
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
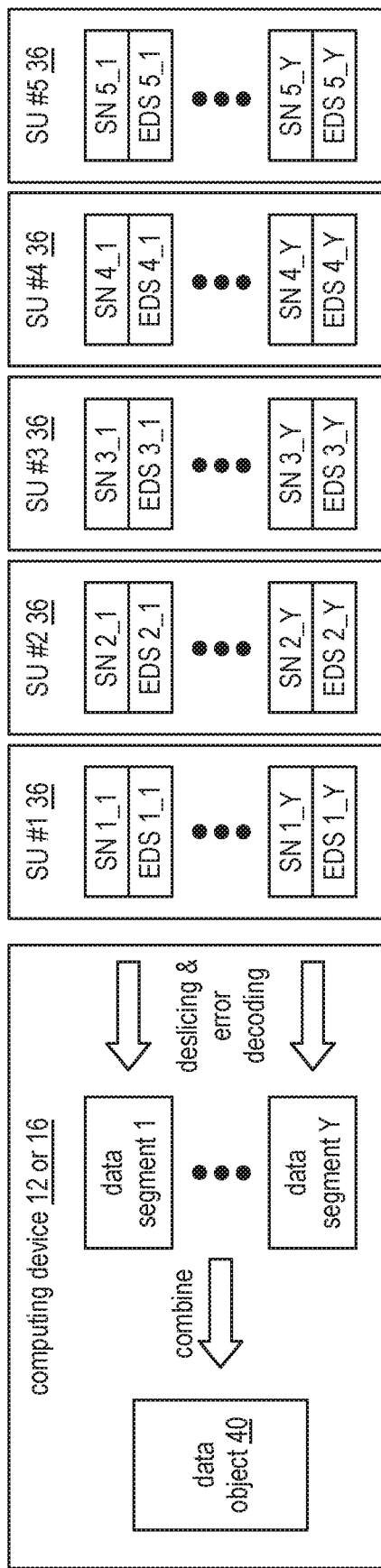
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
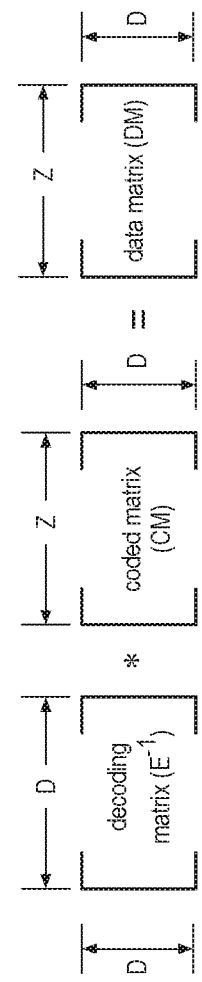
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
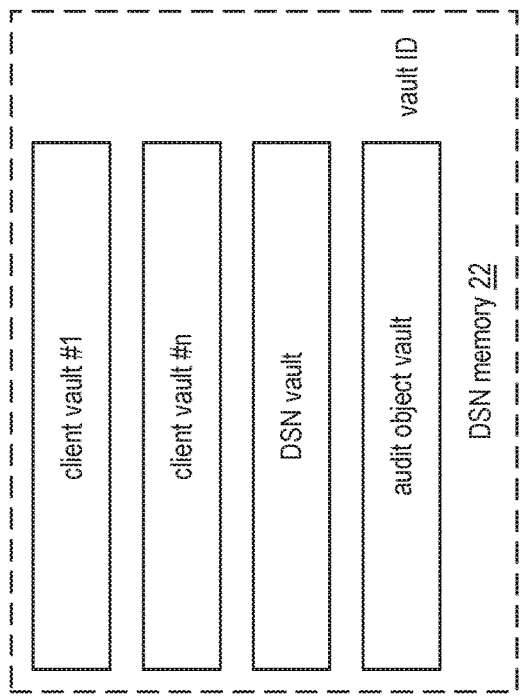
FIG. 9 is a schematic block diagram of an embodiment of dispersed storage network memory in accordance with the present invention.

FIG. 9 is a schematic block diagram of an example of a DSN memory. In this example, the DSN memory 22 includes a client vault #1 through client vault #n, a DSN vault and an audit object vault. The client vaults #1-n include user memory for data that generally allows for data to be one or more of written, read, modified and deleted. The DSN vault includes system memory for storing data, in which access permissions (e.g., from an access control list) may be needed to perform certain data access requests. The audit object vault contains sets of audit objects related to transactions occurring in vaults of a dispersed storage network. The data in the audit object vault may only be written or read. For example, a user may not delete or modify any of the data in the audit object vault.

Figure 10:
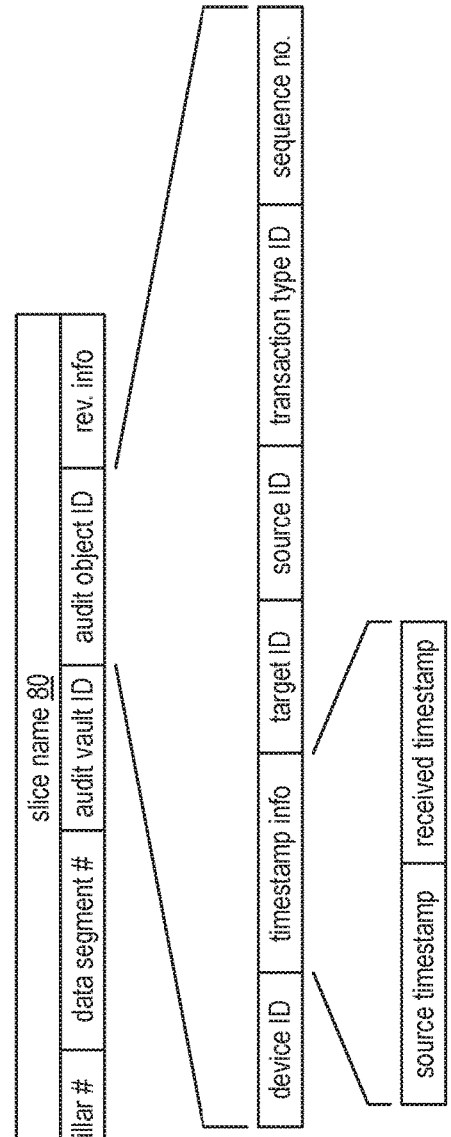
FIG. 10 is a schematic block diagram of an embodiment of a slice name in accordance with the present invention.

FIG. 10 is a schematic block diagram of a slice name 80. The slice name 80 is similar to the slice name 80 of FIG. 6, however the data object ID is replaced by an audit object ID field. As shown, the slice name 80 includes a pillar number field, a data segment number field, an audit vault ID field, an audit object ID field and a revision information field. The audit object ID field includes a device ID field, a timestamp information field, a target ID field, a source ID field, a transaction type ID field, and a sequence number field. The timestamp info field includes a source timestamp field and a received timestamp field.

The audit object ID field of the slice name 80 serves to identify information relating to transactions occurring in a DSN. For example, the audit object ID serves to identify a device in the DSN, a type of transaction and timestamps. As another example, the audit object ID serves to identify a target and a source of a transaction. Each field may be used to search for audit objects based on desired search options. For example, to determine a device's use of the DSN, the device ID field may be used to only return audit objects for a certain device. As another example, to audit a particular timeframe, the timestamp info field can be searched to only return audit objects for transactions occurring during the particular timeframe.

Figure 11:
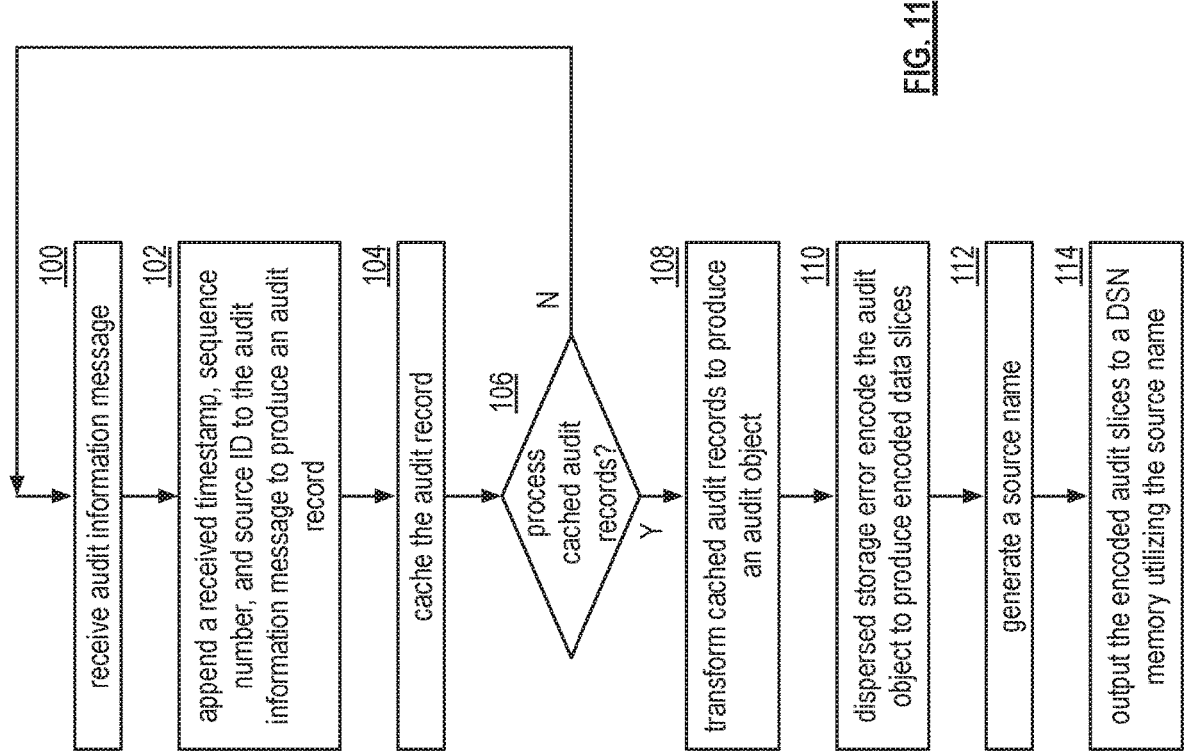
FIG. 11 is a logic flow diagram of an embodiment of an example of creating an audit object in accordance with the present invention.

FIG. 11 is a flowchart illustrating an example of generating an audit object. For example, a device of a dispersed storage network (DSN) generates the audit object. Note the audit object includes at least one record regarding the device's use of the DSN. The method begins at step 100, where a computing device receives an audit information message. The audit information message indicates activity within a dispersed storage network (DSN) and includes one or more of a type code (e.g., read, write, delete, list, etc.), a short message indicator, a long message indicator, a user identifier (ID), an activity timestamp (e.g., a date and time of execution of the activity), an activity indicator, and a source ID. The audit information message may be received from one or more of a user device, a DS client module, a computing device, an integrity processing unit, a managing unit, and a storage unit.

The method continues at step 102, where the computing device appends a received timestamp (e.g., current date and time), a sequence number (e.g., a monotonically and consecutively increasing number), and a source ID (e.g., identifier of machine sending audit information message) to the audit information message to produce an audit record. A structure of the audit record is discussed in greater detail with reference to FIG. 12B. The method continues at step 104, where the computing device caches the audit record in a local memory and/or stores the audit record as encoded data slices in a DSN memory.

The method continues at step 106, where the computing device determines whether to process cached audit records. The determination may be based on one or more of a number of audit records, size of the audit records, and an elapsed time since a last processing. For example, the computing device determines to process cached audit records when the number of audit records is greater than an audit record threshold. The method repeats back to step 100 when the computing device determines not to process the cached audit records. The method continues to step 108 when the computing device determines to process the cached audit records.

The method continues at step 108, where the computing device transforms one or more cached audit records to generate an audit object. The transforming includes determining a number of audit records of the one or more cached audit records to include in the audit object to produce a number of audit records entry for a number of records field within the audit object, aggregating the number of audit records into the audit object, generating integrity information, aggregating the one or more cached audit records, a number of audit records indicator, and the integrity information into the audit object in accordance with an audit object structure. The audit object structure is discussed in greater detail with reference to FIG. 12A. Note the computing device may also generate the audit object to include one or more of a certificate chain and a digital signature.

In a specific example of generating an audit object, the computing device generates a set of audit objects that is regarding a write transaction to storage units of the DSN. The write transaction includes a write sequence number, a write request phase, a write commit phase, and a write final phase. The computing device generates records of the set of audit objects for at least some of: write requests of the write request phase sent from a user device to the storage units, write responses to the write requests sent from at least some of the storage units to the user device, write commit requests of the write commit phase sent from the user device to the storage units, write commit responses to the write commit requests sent from the at least some of the storage units to the user device, write finalize requests of the write finalize phase sent from the user device to the storage units, and write finalize responses to the write finalize requests sent from at least some of the storage units to the user device.

In this example, when the computing device is a user device, the computing device generates a first audit object of a set of audit objects that is regarding transactions between the user device and a first storage unit of the storage units. The first audit object includes a first record regarding a first write request of the write requests sent to the first storage unit, a second record regarding a first write response of the write responses received from the first storage unit, a third record regarding a first write commit request of the write commit requests sent to the first storage unit, a fourth record regarding a first write commit response of the write commit responses received from the first storage unit, a fifth record regarding a first write finalize request of the write finalize requests sent to the first storage unit and a sixth record regarding a first write finalize response of the write finalize responses received from the first storage unit. The computing device may further generate a second audit object of the set of audit objects regarding transactions between the user device and a second storage unit of the storage units.

As another example, the computing device generates a first audit object of a set of audit objects of a read transaction, In this example, the first audit object is regarding transactions between a user device and a first storage unit of the storage units and the first audit object includes a first record regarding a first read request of a set of read requests sent to the first storage unit and a second record regarding a first read response of a set of read responses received from the first storage unit. The computing device then generates a second audit object of the set of audit objects. Here, the second audit object is regarding transactions between the user device and a second storage unit of the storage units. The second audit object includes a first record regarding a second read request of the set of read requests sent to the second storage unit and a second record regarding a second read response of the set of read responses received from the second storage unit.

As yet a further example, when the computing device is a first storage unit of the storage units, the computing device generates a first audit object of the set of audit objects regarding transactions between the user device and the first storage unit. The first audit object includes a first record regarding a first write request of the write requests received from the user device, a second record regarding a first write response of the write responses sent to the user device, a third record regarding a first write commit request of the write commit received from the user device, a fourth record regarding a first write commit response of the write commit responses sent to the user device, a fifth record regarding a first write finalize request of the write finalize requests received from the user device, and a sixth record regarding a first write finalize response of the write finalize responses sent to the user device.

The method continues at step 110, where the computing device dispersed storage error encodes the audit object to produce one or more sets of encoded data slices. The method continues at step 112, where the computing device generates a source name (e.g., common aspects of the slice name 80) corresponding to the one or more sets of encoded data slices. For example, the computing device generates the source name based on at least one of an audit vault ID, an aggregator internet protocol (IP) address, and a current timestamp. As another example, the computing device generates a set of slice names for the set of encoded data slices, wherein each slice name of the set of slice name includes a pillar number section that contains a unique pillar number for a corresponding encoded data slice of the set of slice names and a common section that contains audit object identifying information, wherein the common section includes an audit vault identifier section and an audit object identifier section, wherein the audit object identifier section includes at least some of: a device identifier section, a timestamp section, a target identifier section, a source identifier section, a sequence number section, and a transaction type identifier section.

For example, for a write transaction, the computing device (e.g., the user device) generates a first set of slice names for the first audit object, wherein the device identifier section contains a user device identifier of the user device, the timestamp section contains a timestamp that corresponds to initial time of the write transaction, the target identifier section contains an identifier of the first storage units, the source identifier section contains an identifier of a source of the write transaction (e.g., may be the user device or a different device), the sequence number section contains the write sequence number, and the transaction type identifier section contains a write transaction. The computing device also generates a second set of slice names for the second audit object, wherein the device identifier section contains the user device identifier, the timestamp section contains the timestamp, the target identifier section contains an identifier of the second storage unit, the source identifier section contains the identifier of the source of the write transaction, the sequence number section contains the write sequence number, and the transaction type identifier section contains the write transaction.

In this example, the computing device (e.g., the first storage unit) also generates a first set of slice names for the first audit object wherein the device identifier section contains an identifier of the first storage unit, the timestamp section contains a timestamp that corresponds to an initial time of the write transaction, the target identifier section contains the identifier of the first storage unit, the source identifier section contains an identifier of a source of the write transaction, the sequence number section contains the write sequence number and the transaction type identifier section contains a write transaction.

As another example, for a read transaction, the computing device generates a first set of slice names for the first audit object, wherein the device identifier section contains a user device identifier of the user device, the timestamp section contains a timestamp that corresponds to initial time of the read transaction, the target identifier section contains an identifier of the first storage units, the source identifier section contains an identifier of a source of the read transaction, the sequence number section contains the read sequence number, and the transaction type identifier section contains a read transaction.

The method continues at step 114, where the computing device outputs the one or more sets of encoded data slices to a DSN memory utilizing the source name. For example, the computing device sends the set of encoded data slices in accordance with the set of slice names to a set of storage units of the DSN, wherein the set of slice names corresponds to logical DSN addresses for the set of encoded data slices.

FIG. 12A is a diagram illustrating an example of an audit object file structure. The structure includes an audit object data file 120, wherein the audit object data file 120 may be stored in a dispersed storage network (DSN) as one or more sets of encoded data slices, and wherein the audit object data file 120 is accessible at a logical DSN address when stored as the one or more sets of encoded data slices.

The audit object data file 120 includes a number of records field 122, a set of size indicator fields size 1-R, a set of audit record fields 1-R, and an integrity information field 124. The number of records field 122 includes a number of records entry indicating a number of audit records R included in the audit data object file 120. Each such size indicator field includes a size indicator corresponding to an audit record within the set of audit records 1-R. For example, a size 1 field includes a size 1 entry of 300 when a size of an audit record entry of audit record field 1 is 300 bytes. The integrity information field 124 includes an integrity information entry, wherein the integrity information entry includes integrity information corresponding to the audit object data file. The integrity information is described in greater detail with reference to FIG. 12C.

FIG. 12B is a diagram illustrating an example of an audit record file structure. The structure includes an audit record data file 126, wherein the audit record data file 126 may be aggregated into an audit object data file 120 for storage in a dispersed storage network (DSN) as one or more sets of encoded data slices. The audit record data file 126 includes a sourced timestamp field 130, a received timestamp field 132, an object timestamp field 134, a sequence number field 136, a type code field 138, a source identifier (ID) field 140, a user ID field 142, and a further type information field 144. The sourced timestamp field 130 includes a sourced timestamp entry including a date and time of when a corresponding audit message was generated. The received timestamp field 132 includes a received timestamp entry including a date and time of when a corresponding audit record was generated. The object timestamp field 134 includes an object timestamp entry including a date and time of when a corresponding audit object data file was generated. The sequence number field 136 includes a sequence number entry including a monotonically and consecutively increasing number. The type code field 138 includes a type code entry including a type of DSN activity (e.g., a read indicator, a write indicator, a delete indicator, a valid transaction indicator, an invalid transaction indicator). The source ID field 140 includes a source ID entry indicating an identifier associated with a module or unit (e.g., machine) that sent the corresponding audit information message. The user ID field 142 includes a user ID entry indicating a user ID associated with the audit information message. The further type information field 144 includes a further type information entry including one or more of a function of a type code (e.g., a valid slice name, an invalid user ID, a valid user ID, an invalid slice name, etc.).

FIG. 12C is a diagram illustrating an example of integrity information structure. The structure includes integrity information 124, wherein the integrity information 124 may be aggregated into an audit object data file 120 for storage in a dispersed storage network (DSN) as one or more sets of encoded data slices. The integrity information 124 includes an aggregator identifier (ID) field 150, a certificate chain field 152, a signature algorithm field 154, and a signature field 156. The aggregator ID field 150 includes an aggregator ID of a module or unit that generated the corresponding audit object file. The certificate chain field 152 includes a certificate chain entry including one or more signed certificates of a chain structure. The chain structure includes one or more of a signed certificate associated with the aggregator ID, an intermediate signed certificate, and a root signed certificate. The signature algorithm field 154 includes a signature algorithm entry indicating one or more of an encryption algorithm identifier associated with generating a signature, a public key, and a private key. The signature field 156 includes a signature entry indicating a signature over the entire audit object data file in accordance with a signature algorithm of the signature algorithm entry and a public and/or private key associated with the aggregator ID.

Figure 13:
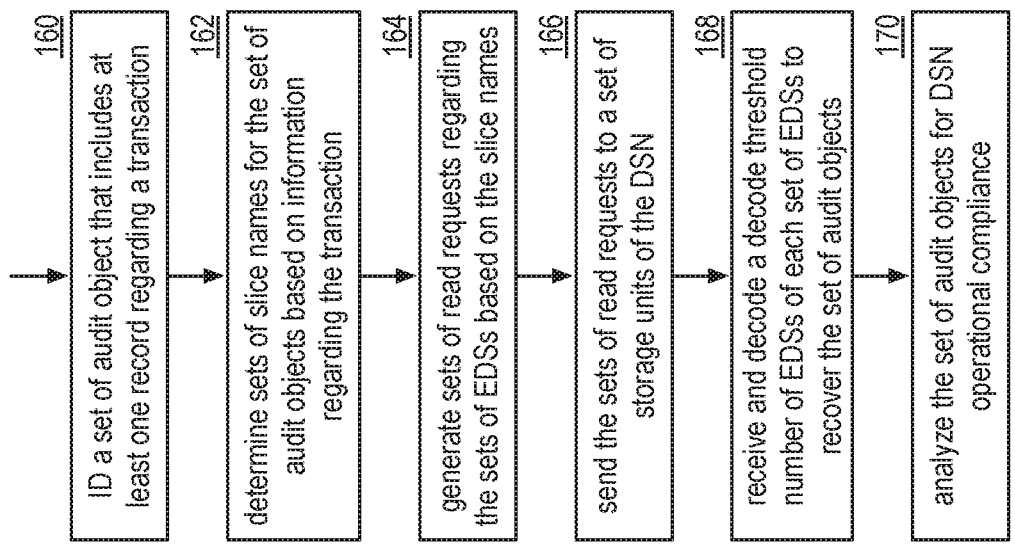
FIG. 13 is logic flow diagram of an example of auditing a transaction in accordance with the present invention.

FIG. 13 is a logic flow diagram of an example of auditing transactions in a dispersed storage network (DSN). The method begins at step 160, where the computing device for a transaction of the transactions identifies a set of audit objects. Note an audit object of the set of audit objects includes at least one record regarding the transaction and the set of audit objects is dispersed storage error encoded to produce sets of encoded data slices. As a specific example, the computing device selects the transaction based on one or more of an identity of a device involved in the transaction (e.g., looks at transactions involving a particular storage unit), a transaction type (e.g., a write, a rebuild, etc.), and a pseudo random selection process. As another example, when the transaction is regarding a data access request (e.g., a write operation, a read operation, a list request, a status report, etc.), the computing device identifies the set of audit objects based on encoding parameters associated with data of the data access request. Note the set of audit objects includes a first subset of audit objects from a device of the transaction to storage units of the transaction and a second subset of audit objects from at least some of the storage units to the device.

The method continues at step 162, where the computing device determines sets of slice names for the set of audit objects based on information regarding the transaction, wherein each slice name of the sets of slice name includes a pillar number section and a common object section, the pillar number section contains a unique pillar number for a corresponding encoded data slice of the sets of slice names, the common object section contains audit object identifying information, wherein the common object section includes an audit vault identifier section and an audit object identifier section, wherein the audit object identifier section includes at least some of: a device identifier section, a timestamp section, a target identifier section, a source identifier section, a sequence number section, and a transaction type identifier section.

The method continues at step 164, where the computing device generates sets of read requests regarding the sets of encoded data slices based on the sets of slice names. The method continues at step 166, where the computing device sends the sets of read requests to a set of storage units of the DSN. The method continues at step 168, where the computing device receives and decodes a decode threshold number of encoded data slices of each of the sets of encoded data slices to recover the set of audit objects.

The method continues with step 170, where the computing device analyzes the set of audit objects for DSN operational compliance. For example, the computing device analyzes the set of audit objects by determining that the first subset of audit objects includes a first appropriate number of audit objects and by determining that the second subset of audit objects includes a second appropriate number of audit objects. When the first and second subsets of audit objects include the first and second appropriate numbers, respectively, the computing device determines whether records of audit objects of the first subset of audit objects correlate with records of audit objects of the second subset of audit objects. When the records of audit objects of the first subset of audit objects correlate with the records of audit objects of the second subset of audit objects, the computing device indicates the transaction passed the audit. When one of the records of audit objects of the first subset of audit objects does not correlate with a corresponding record of the records of audit objects of the second subset of audit objects, the computing device indicates that the transaction failed the audit.

Alternatively, when the records of audit objects of the first subset of audit objects do not correlate with the records of audit objects of the second subset of audit objects, the computing device determines whether non-correlation is due to obtaining less than the second appropriate number of audit objects of the second subset of audit objects. When the non-correlation is due to obtaining less than the second appropriate number of audit objects of the second subset of audit objects, the computing device determines whether a follow-up audit object exists, wherein the follow-up audit object includes one or more records regarding one or more of rebuilding, storage unit service report, storage unit offline report, and storage unit failure report. When the follow-up audit object exists, the computing device indicates that the transaction passed the audit. When the follow-up audit object does not exist, the computing device indicates that the transaction failed the audit.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more computing devices of a storage network, the method comprises:
   receiving a data access request of a transaction regarding a data segment, wherein at least one data segment is dispersed storage error encoded into a set of encoded data slices in accordance with dispersed storage encoding parameters, and wherein the set of encoded data slices are stored in a set of storage units of the storage network;
   executing the data access request;
   generating an audit record data file regarding the execution of the data access request, wherein the audit record data file includes a source identifier, a target identifier, a timestamp, a unique sequence number, and a type code that indicates a type of storage network activity associated with the transaction;
   caching the audit record data file in a first memory of the storage network;
   determining whether to process cached audit record data files, wherein the cached audit record data files include the audit record data file, and wherein a second cached audit record data file of the cached audit record data files has a second unique sequence number;
   when determining to process the cached audit record data files, transforming the cached audit record data files into an audit object data log;
   storing the audit object data log in at least one second memory of the storage network;
   obtaining information associated with the transaction; and
   retrieving, from the at least one second memory, the audit record data file of the audit object data log based on the information associated with the transaction.

2. The method of claim 1 further comprises:
   auditing the transaction for storage network operational compliance, wherein the obtaining the information associated with the transaction includes selecting the transaction.

3. The method of claim 2, wherein the selecting the transaction is based on a device involved in the transaction.

4. The method of claim 2, wherein the selecting the transaction is based on a transaction type.

5. The method of claim 2, wherein the selecting the transaction is based on a pseudo random selection process.

6. The method of claim 2 further comprises:
   identifying the audit record data file based on encoding parameters associated with the data of the data access request.

7. The method of claim 2, wherein a set of audit record data files of the cached audit record data files regarding the transaction includes a first subset of audit record data files from a device of the transaction to storage units of the transaction and a second subset of audit record data files from the storage units to the device.

8. The method of claim 7, wherein the auditing the transaction comprises:
   determining that the first subset of audit record data files includes a first appropriate number of audit record data files;
   determining that the second subset of audit record data files includes a second appropriate number of audit record data files;
   when the first and second subsets of audit record data files include the first and second appropriate numbers, respectively, determining whether records of audit record data files of the first subset of audit record data files correlate with records of audit record data files of the second subset of audit record data files; and
   when the records of audit record data files of the first subset of audit record data files correlate with the records of audit record data files of the second subset of audit record data files, indicating that the transaction passed an audit.

9. The method of claim 8 further comprises:
   when the records of audit record data files of the first subset of audit record data files do not correlate with the records of audit record data files of the second subset of audit record data files, determining whether non-correlation is due to obtaining less than the second appropriate number of audit record data files of the second subset of audit record data files;
   when the non-correlation is due to obtaining less than the second appropriate number of audit record data files of the second subset of audit record data files, determining whether a follow-up audit record data file exists;
   when the follow-up audit record data file exists, indicating that the transaction passed the audit; and
   when the follow-up audit record data file does not exist, indicating that the transaction failed the audit.

10. The method of claim 9, wherein the follow-up audit record data file includes one or more records regarding rebuilding.

11. The method of claim 9, wherein the follow-up audit record data file includes one or more records regarding a storage unit service report.

12. The method of claim 9, wherein the follow-up audit record data file includes one or more records regarding a storage unit off-line report.

13. The method of claim 9, wherein the follow-up audit record data file includes one or more records regarding a storage unit failure report.

14. The method of claim 1, wherein when the data access request is a write request for storing the data segment:
    dispersed storage error encoding, by the computing device, the data segment to produce the set of encoded data slices; and
    sending, by the computing device, the set of encoded data slices to the set of storage units for storage therein.

15. The method of claim 1, wherein when the data access request is a read request for retrieving the data segment:
    sending a set of read requests to the set of storage units regarding the set of encoded data slices;
    receiving at least a decode threshold number of encoded data slices of the set of encoded data slices from the set of storage units;
    dispersed storage error decoding the at least the decode threshold number of encoded data slices to recover the data segment; and
    sending, by the computing device, the recovered data segment to a requesting device associated with the data access request.

16. The method of claim 1, wherein the data access request is a delete request.

17. The method of claim 1, wherein the data access request is a list request.

18. The method of claim 1, wherein the audit record data file further comprises a unique identifier, wherein the unique identifier is a source name associated with the data segment.

19. The method of claim 1, wherein the determining whether to process the cached audit record data files is based on one or more of:
    a number of audit records of the cached audit record data files;
    a size of the audit records of the cached audit record data files; and
    an elapsed time since a last processing of the cached audit record data files.

20. The method of claim 1, wherein the audit record data file further includes indication of validity of a function of the type code.

* * * * *